United States Patent
Rao et al.

(10) Patent No.: US 10,469,644 B1
(45) Date of Patent: Nov. 5, 2019

(54) CONFIGURABLE MOBILE DEVICE FOR AUTHENTICATED COMMUNICATION, VOICE RECOGNITION, AND TOUCH SENSITIVE INPUT

(76) Inventors: Raman Kaliputnam Rao, Palo Alto, CA (US); Sunil Kaliputnam Rao, Palo Alto, CA (US); Sanjay Kaliputnam Rao, Palo Alto, CA (US)

(*) Notice: Subject to any disclaimer, the term of this patent is extended or adjusted under 35 U.S.C. 154(b) by 0 days.

(21) Appl. No.: 10/878,666

(22) Filed: Jun. 28, 2004

Related U.S. Application Data

(63) Continuation of application No. 09/597,607, filed on Jun. 20, 2000, now Pat. No. 6,882,859.

(51) Int. Cl.
  *H04M 1/725* (2006.01)
(52) U.S. Cl.
  CPC ................ *H04M 1/72522* (2013.01)
(58) Field of Classification Search
  USPC ............ 379/93, 16, 17, 25, 101.02, 100.12; 705/12; 455/556.1, 410, 556.2, 456.5, 455/456.6, 550.1, 557, 186.1, 418, 422.1, 455/85, 346, 424, 154, 160, 90, 425, 455/575.1, 566, 344, 561; 345/186, 179, 345/115, 173, 168, 169, 172; 709/227, 709/218, 219
  See application file for complete search history.

(56) References Cited

U.S. PATENT DOCUMENTS

| | | | |
|---|---|---|---|
| 4,117,542 A | 9/1978 | Klausner et al. | |
| 4,386,412 A | 5/1983 | Ito | |
| 4,465,401 A | 8/1984 | Stoddord et al. | |
| 4,514,920 A | 5/1985 | Shafrir et al. | |
| 4,517,660 A | 5/1985 | Fushimoto et al. | |
| 4,670,747 A * | 6/1987 | Borras et al. ............ 340/825.56 |
| 4,675,653 A | 6/1987 | Priestly | |
| 4,696,054 A | 9/1987 | Tsugei | |
| 4,719,338 A | 1/1988 | Avery et al. | |

(Continued)

FOREIGN PATENT DOCUMENTS

| | | | | |
|---|---|---|---|---|
| EP | 0849925 | * | 6/1998 | ............ H04M 3/50 |
| WO | WO 1992//003884 | | 3/1992 | |

OTHER PUBLICATIONS

U.S. Appl. No. 09/597/607, filed Jun. 20, 2000.

(Continued)

*Primary Examiner* — Ankur Jain

(57) ABSTRACT

Processing of the authentication data includes use of information of the comparing to determine a match condition of the authentication data. Authentication data may be one or more of a user profile, voice data, audio data, video data, photographic data, handwriting data, fingerprint data, retinal scan data, and location information. The software for recognizing a finger print could reside on a network server or on the hand held device. The present invention also allows for the person to speak to a cell phone/hand held device and access remote macros. For example, by stating "open garage". This command could connect to a network server which would then authenticate the voice. Since voice recognition could be burdensome, this operation could be performed on a networked server or on the hand held device. Once the voice has been recognized through voice recognition software, the command will be performed.

42 Claims, 3 Drawing Sheets

(56) References Cited

U.S. PATENT DOCUMENTS

| | | | |
|---|---|---|---|
| 4,772,876 A * | 9/1988 | Laud | 340/539.22 |
| 4,844,637 A * | 7/1989 | Buisson et al. | 341/23 |
| 4,853,888 A * | 8/1989 | Lata et al. | 345/172 |
| 4,908,866 A * | 3/1990 | Goldwasser et al. | 704/201 |
| 4,912,640 A | 3/1990 | Tsugei | |
| 5,034,858 A | 7/1991 | Kawamoto et al. | |
| 5,164,723 A | 11/1992 | Nebenzahl | |
| 5,195,130 A | 3/1993 | Weiss et al. | |
| 5,198,798 A | 3/1993 | Lietzow et al. | |
| 5,263,118 A * | 11/1993 | Cornelison | 704/200 |
| 5,276,794 A * | 1/1994 | Lamb, Jr. | 715/507 |
| 5,335,276 A * | 8/1994 | Thompson et al. | 380/266 |
| 5,351,189 A | 9/1994 | Doi et al. | |
| 5,379,341 A | 1/1995 | Wan | |
| 5,410,738 A | 4/1995 | Diepstraten et al. | |
| 5,440,502 A * | 8/1995 | Register | 361/681 |
| 5,465,401 A | 11/1995 | Thompson | |
| 5,496,992 A * | 3/1996 | Madan et al. | 235/472.02 |
| 5,502,460 A | 3/1996 | Bowen | |
| 5,513,242 A | 4/1996 | Mukerjee et al. | |
| 5,517,553 A | 5/1996 | Sato | |
| 5,539,391 A | 7/1996 | Yuen | |
| 5,552,806 A * | 9/1996 | Lenchik | 345/156 |
| 5,555,258 A | 9/1996 | Snelling et al. | |
| 5,559,794 A | 9/1996 | Willis et al. | |
| D374,675 S | 10/1996 | Sakai et al. | |
| 5,565,929 A | 10/1996 | Tanaka | |
| 5,566,205 A | 10/1996 | Delfine | |
| 5,577,118 A | 11/1996 | Sasaki et al. | |
| 5,594,953 A * | 1/1997 | Ross et al. | 455/575.7 |
| 5,604,688 A | 2/1997 | Chu et al. | |
| 5,615,277 A * | 3/1997 | Hoffman | 382/115 |
| 5,644,338 A * | 7/1997 | Bowen | 345/168 |
| 5,660,246 A * | 8/1997 | Kaman | 180/287 |
| 5,673,080 A | 9/1997 | Biggs et al. | |
| 5,751,835 A * | 5/1998 | Topping et al. | 382/115 |
| 5,760,773 A * | 6/1998 | Berman et al. | 715/808 |
| 5,784,888 A * | 7/1998 | Termuehlen | 60/677 |
| 5,793,413 A | 8/1998 | Hylton et al. | |
| 5,793,639 A * | 8/1998 | Yamazaki | 700/226 |
| 5,797,089 A | 8/1998 | Nguyen | |
| 5,847,698 A | 12/1998 | Reavey et al. | |
| 5,854,997 A | 12/1998 | Sukeda et al. | |
| 5,856,819 A | 1/1999 | Vossler | |
| 5,878,399 A * | 3/1999 | Peralto | 705/12 |
| 5,901,222 A | 5/1999 | Macor | |
| 6,046,730 A * | 4/2000 | Bowen et al. | 345/168 |
| 6,058,304 A * | 5/2000 | Callaghan et al. | 455/422.1 |
| 6,121,960 A | 9/2000 | Carroll et al. | |
| 6,141,592 A | 10/2000 | Pauly | |
| 6,169,789 B1 * | 1/2001 | Rao et al. | 379/110.01 |
| 6,209,034 B1 * | 3/2001 | Gladwin et al. | 709/227 |
| 6,268,806 B1 * | 7/2001 | Frager et al. | 341/22 |
| 6,295,052 B1 * | 9/2001 | Kato et al. | 345/179 |
| 6,358,202 B1 | 3/2002 | Arent | |
| 6,440,069 B1 | 8/2002 | Raymond et al. | |
| 6,525,750 B1 | 2/2003 | Knox | |
| 6,587,700 B1 | 7/2003 | Meins et al. | |
| 6,751,473 B1 | 6/2004 | Goyal et al. | |
| 6,858,006 B2 | 2/2005 | MacCarter et al. | |
| 6,882,859 B1 * | 4/2005 | Rao et al. | 455/550.1 |
| 6,920,283 B2 | 7/2005 | Goldstein | |
| 7,107,547 B2 | 9/2006 | Cule et al. | |
| 7,260,436 B2 | 8/2007 | Kilgore et al. | |
| 7,382,247 B2 | 6/2008 | Welch et al. | |
| 7,629,881 B2 | 12/2009 | Gao et al. | |
| 2002/0072860 A1 | 6/2002 | Amano | |
| 2003/0041032 A1 | 2/2003 | Ballin et al. | |
| 2003/0112148 A1 | 6/2003 | Belliveau | |
| 2004/0049245 A1 | 3/2004 | Gass et al. | |
| 2005/0146431 A1 | 7/2005 | Hastings et al. | |
| 2006/0034252 A1 | 2/2006 | Karaoguz et al. | |
| 2006/0075014 A1 | 4/2006 | Tharappel et al. | |
| 2006/0173498 A1 | 8/2006 | Banville et al. | |
| 2006/0222179 A1 | 10/2006 | Jensen et al. | |
| 2007/0103324 A1 | 5/2007 | Kosuge et al. | |
| 2007/0191070 A1 | 8/2007 | Rao | |
| 2008/0048960 A1 | 2/2008 | Jacobsen et al. | |
| 2008/0129465 A1 | 6/2008 | Rao | |
| 2008/0146272 A1 | 6/2008 | Rao et al. | |
| 2008/0164979 A1 | 7/2008 | Otto | |
| 2008/0167614 A1 | 7/2008 | Tolkowsky et al. | |
| 2011/0059777 A1 | 3/2011 | Rao | |

OTHER PUBLICATIONS

U.S. Appl. No. 10/769,621, filed Jan. 30, 2004.
U.S. Appl. No. 11/644,308, filed Dec. 21, 2006.
U.S. Appl. No. 12/876,050, filed Sep. 3, 2010.
U.S. Appl. No. 11/805,610, filed May 23, 2007.

* cited by examiner

CONFIGURABLE MOBILE DEVICE FOR AUTHENTICATED COMMUNICATION, VOICE RECOGNITION, AND TOUCH SENSITIVE INPUT

CROSS REFERENCE TO RELATED APPLICATIONS

The present application is a continuation of U.S. Ser. No. 09/597,607, filed on June 20, 2000, now U.S. Pat. No. 6,882,859, issued on Apr. 19, 2005.

BACKGROUND OF THE INVENTION

Currently the key pad buttons on a cellular telephone/mobile device (CT/MD) pose a limitation in inputting broad based queries. There are only 12 non-control buttons on many CT/MDs. Even where there are more, there are so few that inputting even as little as the letter-number ASCII set is not really practical. For example, in the present art there have been attempts to expand the number of keys, such as treating the numeric keys as numbers unless a code is entered, such as "* #" or the like, then treating a "2" as an "a", "2-2" as a "b", and "2-2-2" as a "c". Entering "2" three times to form a "c" is both confusing and slow, and such approaches have not been popular. If a mixed string of letters and numbers are desired, the three "2"s may have to be delimited with, for example, "* #", and the process becomes increasingly more unwieldy. There has been some success in using a computer, especially a computer operating with "fuzzy" logic, to extract the probable combination of letters in a numeric string, exemplified by an interactive directory for finding the telephone extension number of an employee by "spelling" the employee's name on a numeric key pad. This is a satisfactory solution only in limited cases. Numeric reduction of this type has not been generally used except for telephone directories and similar purposes.

SUMMARY OF THE INVENTION

It is an object of the present invention to provide a scheme by which the limitations of a key pad are overcome and the key pad is enhanced. The scheme uses a local or network server.

The protocols for configuring each key to a specific function or variable set of functions are stored in a Server C. The protocols for all keys may be stored on Server C similarly. The menu for any macro function can be stored on this Server C. Server C may be part of a local loop or located on the internet.

In an embodiment of the present invention, displays, such as small LCD displays, are mounted on the top of the keys and connected to a matrix addressing system. When a key is reconfigured, such as from an English language "A" to some Japanese character, the legend displayed on the key with the small display is changed accordingly.

In another embodiment of the present invention, the keyboard is displayed in the display window of a computing device, such as a hand held wireless device. The term wireless device includes entertainment/game machines. The screen of the wireless device is touch sensitive, so the user can type on the screen as if it were a standard keyboard.

In another embodiment of the present invention, the keyboard is displayed on a separate screen in the position of and replacing the keyboard on a device, such as a hand held wireless device. This screen is touch sensitive, so the user may type on it as if it were a keyboard.

In another embodiment of the present invention, the keys on any of the above keyboards, as well as on keyboards of the present invention generally, have a sound output, such as a voice output. In this way visually impaired or persons with similar concerns can listen to what keys are being depressed.

Other objects, features and advantages of the present invention will become apparent from the following detailed description when taken in conjunction with the accompanying drawings.

BRIEF DESCRIPTION OF THE SEVERAL VIEWS OF THE DRAWING

The accompanying drawings, being incorporated in and forming a part of this specification, illustrate embodiments of the invention and, together with the description, serve to explain the principles of the present invention.

DETAILED DESCRIPTION OF THE INVENTION

Figure 1:
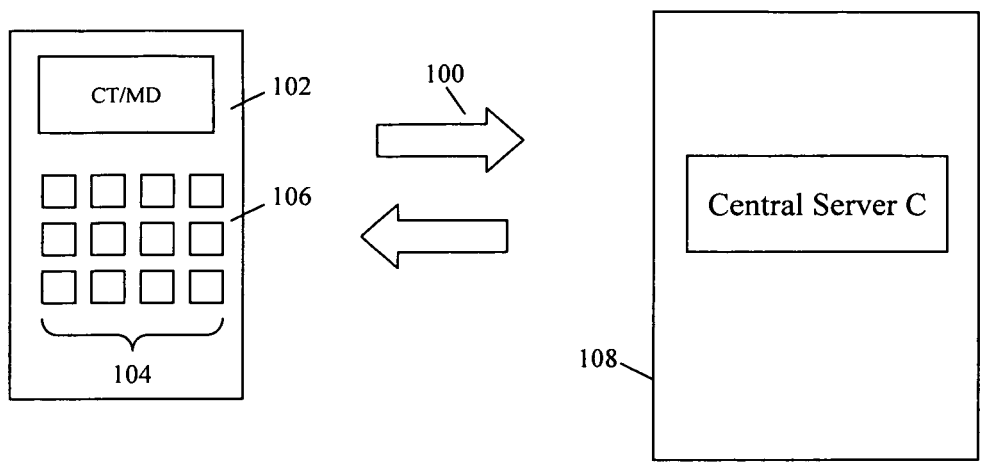
FIG. 1 is an embodiment of the present invention showing a CT/MD with a reconfigurable keyboard communicating with a Central Server C.

The present invention provides means for more easily and intuitively assigning, for example, key values to a wireless device such as to a key associated with the wireless device. The present invention also provides means for compressing or expanding the keys on an entry system such as a wireless device or wireless computing device to more efficiently provide keys needed for entry or other reasons, such as sound, in a desired space.

The present invention uses a Central Server C providing the software routines and other support for realizing the improved input key means for a wireless device or for a wireless computing device.

Thus the Server C contains a number of menus for different applications comprising of assigned values for each key function.

1. Individual Key→may take one or more values that are programmable.

2. Full set or subset of keys→may take one or more values that are programmable.

3. The individual or subset or full set of keys→is programmable to perform assigned functions.

4. The above individual or subset or full set of keys in combination may comprise a menu to perform various customizable functions.

5. The identity of each programmed value for a key, set of keys or full set of keys is stored in the Server C.

6. The menus, sub menus and individual key functions are stored in Server C and may be accessed for use by wired or wireless means. They can be dynamically changed as defined by the user's needs.

7. The user may easily go from one set of functions or menus to another set of functions or menus by selecting an option from the CT/MD.

8. The menus or functions may coexist on the CT/MD. One function or menu may go to the background and one may be in the foreground. One set may be primary and the others secondary or a hierarchy of functions/menus may be maintained, such as with a windowing of templates, where the user may change templates in the same manner as changing windows on a personal computer (PC).

9. Server C manages the delivery of these functions to the CT/MD and also maintains a history.

10. This same process is extendible to pen based inputs where certain figures or icons or strokes may be designated to indicate certain functions or menus that we stored on the Server C and delivered as needed by a command from the CT/MD.

11. This same process is extendible to voice based input commands and output where each voice command or output means a certain function or a menu that is stored in Server C. The voice recognition function in addition may add more functionality to respond to a given voice. The voices may be in different languages.

12. The same process may be extendible to sounds rather than voice; for example, the sound of a bell.

In addition the CT/MD may contain electronics and process capability to internally store the various programmable key functions or menus such that different functions and menus may be chosen as the need arises.

In addition, the web server may be shrunk into a microchip that can be part of the internal electronics of the CT/MD, in which case a local or network server may or may not be needed. In this event the features described above for programming and describing each key or input/output could be handled by the internal web server independently or in conjunction with a local or network Server C.

If a user initiates communication with a particular device, i.e., if a user selects a particular device, the system may understand the context and may change the keypad automatically. Thus the system may perform context-aware keypad changes. This context may be based upon location, the devices communicated with, devices present in its local environment, or other factors FIG. 1 illustrates a wireless system 100 with a CT/MD 102 having a dynamically reconfigurable keypad 104. Such a keypad 104 provides the ability to define macro keys not included with the standard alphanumeric keypad. In FIG. 1, a CT/MD 102 which seems standard has display devices mounted on each key 106, so that the legend appearing on the key 106 is configurable in software such as from Central Server C 108 without requiring external physical changes.

Figure 2:
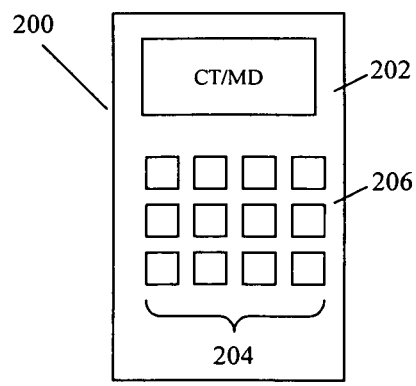
FIG. 2 is an embodiment of the present invention showing a CT/MD with display devices on the keys for defining the function of the key dynamically.

FIG. 2 illustrates a wireless device 200 such as a CT/MD having a display 202 and a key pad 204. The key pad 204 has keys such as key 206 which are assignable as desired in software.

The user may choose to reassign a key on the wireless device to represent a particular function. For example, the user could assign a key to serve as a garage door opener. The user may also use this functionality for universal language capability, such as to change an English keypad to serve as a Japanese keypad. The display mounted on the key may be used to change the keypad template, such as by introducing a Japanese character on the key replacing the English letter "A" or a macro such as "open garage door".

Figure 3:
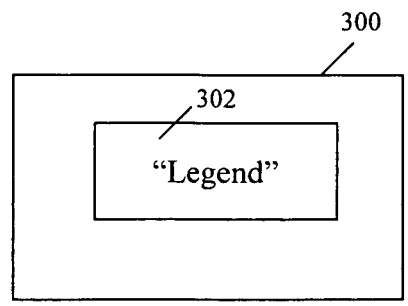
FIG. 3 is an embodiment of the present invention showing a key with a screen or display thereon for containing a legend.

FIG. 3 shows an embodiment of the present invention in the form of a key 300 such as a key that might be found on a multifunction keyboard. In FIG. 3, the key 300, such as a key from a multi-function keypad, is composed of a liquid crystal display (LCD) which can be modified with electrical inputs only. In this manner, as new templates are used, the key 300 will immediately reflect these changes. Thus, when a key 300 is reassigned a new name and function, the key's new name can become apparent to the user as a legend 302 on the key 300 itself.

The LCD or similar display need not form a part of the key. A clear button made of, for example, plastic may encase a LCD type display which may or may not be touch sensitive; that is, a touch sensitive LCD. As new templates are loaded, the LCD display is modified to reflect these changes.

Figure 4:
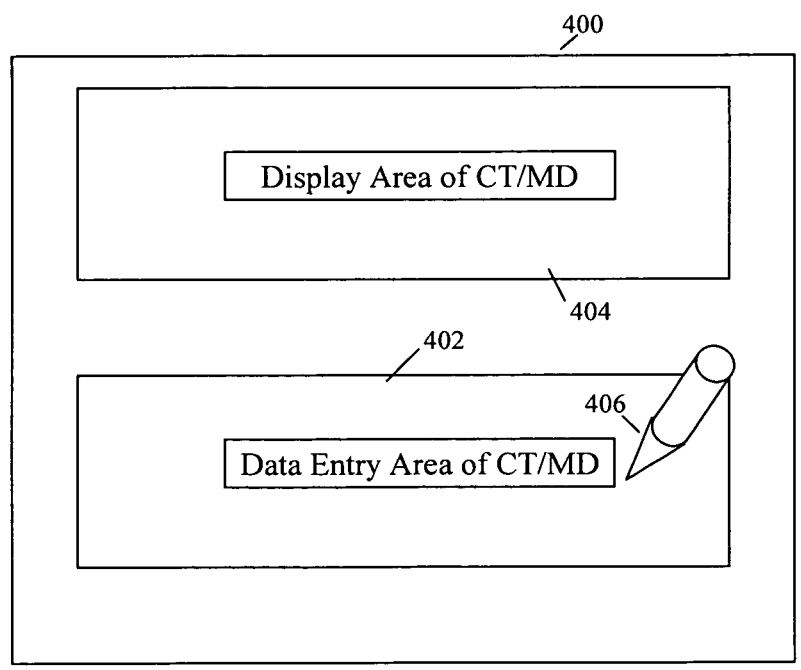
FIG. 4 is an embodiment of the present invention showing a wireless device having a screen for containing a keypad which is accessed by a pointer, such as a stylus.

FIG. 4 shows an embodiment of the present invention with a CT/MD 400. FIG. 4 shows the CT/MD 400 having a dynamic key pad 402 such as a touch sensitive LCD panel. The CT/MD 400 optionally includes a liquid crystal display (LCD) 404. If a writing area is present then new templates can be loaded with, for example, selectable icons, and a stylus 406 can be used to choose the various keys.

Server Based, Remote Handwriting Recognition

Handwriting recognition may be processing intensive. Wireless devices may not have the processing capability to perform advanced handwriting recognition techniques within a reasonable time. The wireless devices can offload handwriting recognition functions to a central server. The server may then transmit the recognized characters back to the wireless device, such as screen 402.

This could serve also as a signature authentication or finger print authentication mechanism. A scanner could be used to perform finger print authentication. Such authentication could take place remotely on a Central Server C 108.

Figure 5:
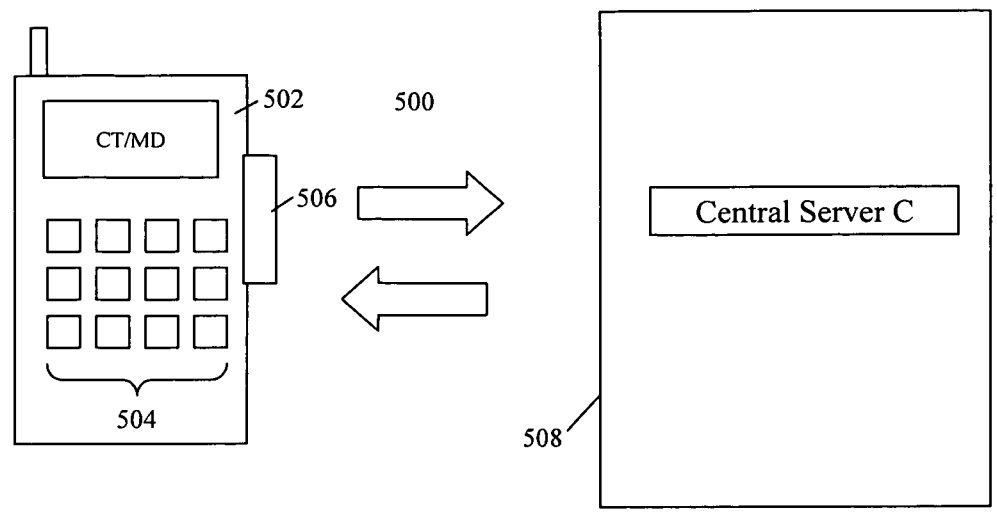
FIG. 5 is an embodiment of the present invention showing a wireless device having a microphone for allowing voice entries for language translation.

FIG. 5 illustrates a wireless system 500 which is an embodiment of the present invention. In FIG. 5, a wireless device 502 transmits an image of the text that has been captured from the writing area 504. This may be a bit map image or it could be in a standard format that both the wireless device 502 and Central Server C 508 understand.

The wireless device 502 establishes a wireless connection with the Central Server C 508 and transmits the image in a standard format. The Server C 508 then performs the processing on the image and converts it into a format of standard recognized characters which the wireless device 502 understands. The server 508 thus takes an image format of the inputted information and converts it into another format of known characters. After this processing is complete the server C 508 can then transmit the converted format back to the wireless device 502. The server C 508 could also perform language translation on the inputted information. A microphone 506 at the wireless device 502 accepts voice. Voice clips may be transferred to the server 508 and converted to text using voice recognition software at the server 508. Alternatively, language translation may be performed on the voice file for voice based language translation. After the server 508 has performed these processing steps, voice files or text may be sent back to the wireless device 502.

The system 500 can also be used for user authentication such as with finger print, eye print, or password authentication.

Authentication:

Additionally, the key pad 400/stylus 406 interface could be redefined so that a finger print could be taken for image authentication. This image would be used, for example, for user authentication. The software for recognizing a finger print could reside on a network server 508 or on the hand held device 502.

The present invention allows for handwriting recognition and can be used for authentication. The recognition software can be on the network server or on the hand held device. The present invention also allows for the person to speak to a cell phone/hand held device and access remote macros. For example, by stating "open garage". This command could connect to a network server 508 which would then authenticate the voice. Since voice recognition could be burdensome, this operation could be performed on a networked server 508 or on the hand held device 502. Once the voice has been recognized through voice recognition software, the command will be performed.

Figure 6:
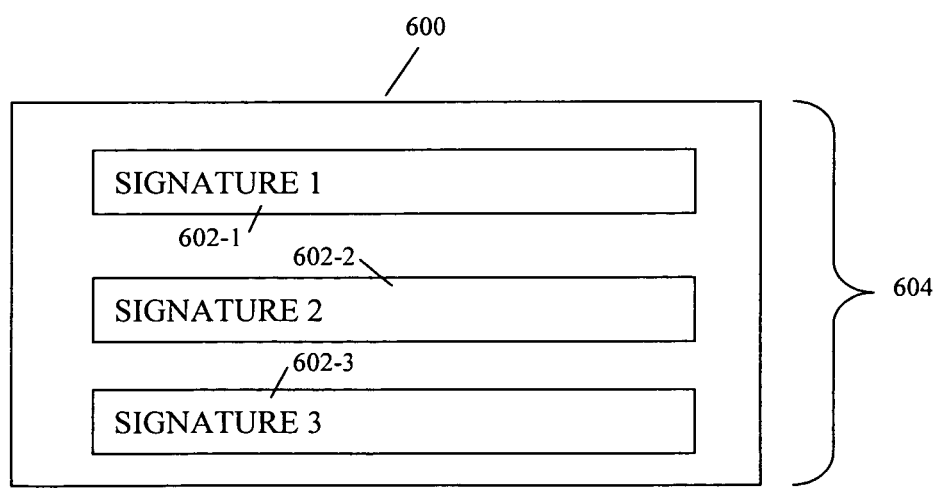
FIG. 6 is an embodiment of the present invention showing how users of the present invention who are physically separated can collaborate in a signing ceremony.

In FIG. 6, an embodiment of an input pad such as a touch sensitive screen 600 of another part of the invention allows for collaborating. The present invention allows screens such as screen 600 to be viewed interactively for interacting from separate devices. For example, if three screens such as screens 602-1, 602-2, 602-3 are used to sign a document from different places, signatures 602 can be on separate screens 600 and optionally displayed on other screens as well. Each screen can be watched separately, with signing being done in parallel or sequentially on the separate screens. This allows the signatures displayed on screens 602 to be placed on a virtual document 604 for interactive verification. Each signature displayed on screens 602 can have a different trust level. The escrow agent is Server C 508.

The present invention has been described with a number of features and advantages. For example, one embodiment of the present invention provides a keyboard device including a plurality of configurable keys and a central server where the central server includes means for dynamically configuring a legend on a selected key from the configurable keys, means for detecting an actuation (selection) of the selected key with the legend, and means for associating the actuation of the selected key with the legend on the selected key. The central server could be remote or local to the keyboard device.

The keys in the keyboard typically could be LCDs for displaying the respective legends, and desirably are touch sensitive.

The keyboard device could be voice based, sound based or macro based, including key, sound or voice. The keyboard device could be wireless, such as a cellular telephone or mobile device. The keyboard device could be non-wireless.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the present invention and its practical application, to thereby enable others skilled in the art to best utilize the present invention and various embodiments, with various modifications, as are suited to the particular use contemplated. It is intended that the scope of the invention be defined by the Claims appended hereto and their equivalents.

What is claimed is:

1. A mobile device comprising:
a processor, a touch sensitive display, a keyboard, a memory and one or more software programs stored in the memory of the mobile device,
wherein text is presented on the touch sensitive display;
wherein a software for recognizing a fingerprint resides on the mobile device;
wherein a microphone of the mobile device is enabled to accept a voice input and send a clip of the voice input to a server; wherein the server is enabled to perform voice recognition on the clip to generate a text; wherein the server is enabled to send the text to the mobile device;
wherein the mobile device is configured to acquire sound from the microphone, and
wherein the mobile device is configured with a plurality of keyboard configurations; wherein a user is enabled to reassign a key to represent a function; and wherein the mobile device is enabled with voice recognition.

2. The device of claim 1, wherein the device is configured to receive authentication data, and wherein the device determines a match of the authentication data based on a comparison of the authentication data.

3. The device of claim 2, wherein the authentication data is audio data, wherein the processor is configured to process the audio data by transferring the audio data to one or more of a plurality of mobile devices and comparing the audio data to audio data samples stored in the memory device of one or more of the plurality of mobile devices, wherein the processor is configured to process the audio data by using information of the comparing to determine a match condition of the audio data.

4. The device of claim 3, wherein the audio data includes one or more of voice data of a person and sound data received at a mobile device.

5. The device of claim 4, wherein the processor is configured to convert the audio data to a text format.

6. The device of claim 2, wherein the authentication data is handwriting data, wherein the processor is configured to process the handwriting data by transferring the handwriting data to one or more of a plurality of mobile devices and comparing the handwriting data to handwriting data samples stored in the memory device of one or more of the plurality of mobile devices, wherein the processor is configured to process the handwriting data by using information of the comparing to determine a match condition of the handwriting data to a person.

7. The device of claim 2, wherein the processor of a first mobile device is configured to process the authentication data by comparing the authentication data to data samples stored in the memory device of a first mobile device.

8. The device of claim 2, wherein the processor of a first mobile device is configured to process the authentication data by transferring the authentication data to a second mobile device, wherein the processor of the second mobile device performs the comparing of the authentication data to data samples stored in the memory device of the second mobile device.

9. The device of claim 8, wherein the processor of the first mobile device determines the match condition using information of the comparing.

10. The device of claim 8, wherein the processor of the second mobile device determines the match condition using information of the comparing.

11. The device of claim 2, wherein the processor controls communication between a plurality of mobile devices according to the match condition.

12. The device of claim 2, wherein the processor controls access by a person to a host mobile device of a plurality of mobile devices according to the match condition.

13. The device of claim 2, wherein the processor controls access to services of a network via a mobile device according to the match condition.

14. The device of claim 2, wherein the processor controls access to a vehicle via a mobile device according to the match condition.

15. The device of claim 2, wherein the processor controls a transaction via a mobile device according to the match condition.

16. The device of claim 15, wherein the transaction is a travel transaction, wherein the travel transaction includes one or more of traveler authentication, issuance of tickets, authorization of travel documents, authorization of travel permissions, passenger screening, baggage screening, pre-boarding procedures, post boarding procedures, immigration clearance procedures, and customs clearance procedures.

17. The device of claim 2, wherein the authentication data includes data selected from a group consisting of audio, handwriting, user profiles, passwords, finger prints, retinal scans, photos, images, and video.

18. The device of claim 2, wherein the processor is configured to process the authentication data by digitizing the authentication data.

19. The device of claim 2, wherein the processor is configured to process the authentication data by storing the authentication data in a database of one or more of a plurality of mobile devices.

20. The device of claim 19, wherein the database includes the data samples, wherein the data samples include data samples of the person and data of at least one location of the mobile device.

21. The device of claim 2, wherein comparing the authentication data includes comparing the authentication data to data stored in the memory of the mobile device.

22. The device of claim 2, wherein comparing the authentication data includes comparing the authentication data to data stored in the memory of a second mobile device.

23. The device of claim 2, wherein the match condition includes one of a positive match, a conditional match, and a negative match.

24. The device of claim 1, wherein the device includes a microphone.

25. The device of claim 1, wherein the mobile device includes one or more of a keyboard, a touch screen display, a display, an audio receiver, a camera, and a scanner.

26. The device of claim 1, wherein the device receives information from a server that is part of one or more of a wired network and a wireless network.

27. The device of claim 1, wherein the mobile device includes one or more of servers, portable computers (PCs), multifunction communication devices, cellular telephones, and personal digital assistants (PDAs).

28. The device of claim 1, wherein the processor dynamically configures the keyboard as an input device and output device and the touch sensitive display as an input device and output device.

29. The device of claim 1, wherein the keyboard is for input and output and the touch sensitive display is for input and output.

30. The device of claim 1 wherein the icon dynamically updated with a different additional or modified icon in response to context information, wherein the context information includes one or more of location of the mobile device and information received from a server.

31. The device of claim 1 wherein the mobile device is configured to receive an information message from a server and wherein the keyboard on the mobile device is updated with a different, additional or modified keyboard based on the information message from the server.

32. The device of claim 1 wherein one or more windows are displayed on the mobile device wherein a keyboard or icon is displayed in a window on the mobile device in response to an information message received from a server.

33. The device of claim 1 wherein the keyboard is dynamically updated with a different, additional or modified keyboard in response to context information, wherein the context information includes one or more of location of the mobile device, recent configurations of the keyboard, and information received from a server.

34. The device of claim 1 wherein the mobile device supports keyboards in one or more languages.

35. The device of claim 1 wherein the keyboard can be a full function, partial function or touch screen keyboard.

36. The device of claim 1 wherein the mobile device is configured to receive a voice input from the user.

37. The device of claim 1 wherein the software program is configured to be executed by the processor on the mobile device, wherein the software program is executed upon contact with an icon on the touch sensitive display.

38. The device of claim 1, wherein the device is configured to receive authentication data, wherein the processor of a first mobile device is configured to process the authentication data by transferring the authentication data to an electronic device, wherein the processor of the electronic device performs the comparison of the authentication data to data samples stored in the memory of the electronic device.

39. The device of claim 1, wherein the device is configured to receive authentication data, wherein the processor of a first mobile device is configured to process the authentication data by transferring the authentication data to one or more servers, wherein the processor of one or more servers performs the comparison of the authentication data to data stored in memory accessible by one or more servers.

40. The device of claim 1, wherein the device determines a verification condition of the authentication data based on a comparison of the authentication data to stored data samples stored in the memory of the mobile device.

41. The mobile device of claim 1, wherein the mobile device is enabled to provide context-aware keypad changes based upon devices present in the local environment and the location of the mobile device.

42. The mobile device of claim 1, wherein the mobile device is enabled to perform voice recognition locally and to convert voice to text using the server with voice; wherein the server is enabled to store configurations associated with the mobile device; and wherein the server performs voice to text translation on the mobile device.

* * * * *